United States Patent [19]

Bergsten

[11] Patent Number: 4,889,087
[45] Date of Patent: Dec. 26, 1989

[54] TENSIONING ARRANGEMENT FOR A POWER-TRANSMITTING ELEMENT INCORPORATED IN A TRANSMISSION

[75] Inventor: Lars Bergsten, Järna, Sweden

[73] Assignee: Saab-Scania Aktiebolag, Sweden

[21] Appl. No.: 352,760

[22] Filed: May 16, 1989

[30] Foreign Application Priority Data

May 19, 1988 [SE] Sweden ............................... 88018700

[51] Int. Cl.$^4$ ............................ F01L 1/04; F16H 7/08
[52] U.S. Cl. ................................... 123/90.31; 474/110
[58] Field of Search ................. 123/90.15, 90.31; 474/110, 111, 135, 138

[56] References Cited

U.S. PATENT DOCUMENTS

| | | | |
|---|---|---|---|
| 3,463,022 | 8/1969 | Miller | 474/110 |
| 4,543,079 | 9/1985 | Matsuda et al. | 474/110 |
| 4,741,299 | 5/1988 | Matsuura et al. | 123/90.31 |
| 4,761,155 | 8/1988 | Kinoshita et al. | 474/110 |

FOREIGN PATENT DOCUMENTS

| | | | |
|---|---|---|---|
| 0121344 | 7/1983 | Japan | 474/110 |
| 0248952 | 11/1986 | Japan | 474/135 |
| 1038657 | 8/1983 | U.S.S.R. | 474/110 |

*Primary Examiner*—Charles J. Myhre
*Assistant Examiner*—Weilun Lo
*Attorney, Agent, or Firm*—Ostrolenk, Faber, Gerb & Soffen

[57] ABSTRACT

A tensioning arrangement for a chain incorporated in a transmission and intended to be driven in an endless path. The tensioning arrangement comprises a spring element that acts on a piston to move it outwards to tension the chain when the transmission is not in operation. The tensioning arrangement is also designed with a space that is supplied with oil when the transmission is in operation, in which connection the oil imparts to the piston a limited inward movement to slacken the chain.

17 Claims, 2 Drawing Sheets

4,889,087

TENSIONING ARRANGEMENT FOR A POWER-TRANSMITTING ELEMENT INCORPORATED IN A TRANSMISSION

BACKGROUND AND SUMMARY OF THE INVENTION

The present invention relates to a tensioning arrangement for a power-transmitting element incorporated in a transmission, and is intended to be driven in an endless path.

In internal combustion engines chain transmissions are often used for driving the camshaft of the engine via its crankshaft. In order to compensate for chain wear, it is customary to use a tensioning arrangement which automatically presses against the chain and tensions it.

The force which is required to tension the chain is generated in commercially available tensioning arrangements by means of a piston which is displaceably arranged in a cylinder and to which is conveyed by a spring element, for example a compression spring, a movement projecting it out of the cylinder to tension the chain.

In this connection the piston cooperates with a locking arrangement which allows the piston to project out of the cylinder in order to tension the chain, but prevents the piston from moving back into the cylinder and thus causing the chain to slacken.

In known solutions of the type in question the chain acquires a certain over-tensioning. This is regarded as being necessary in order to ensure that the chain will be sufficiently tensioned under all operating conditions.

Known solutions have a number of disadvantages, of which it may be mentioned that the over-tensioning contributes to the noise intensity increasing in the chain transmission and to the wearing of the chain being accelerated.

The disadvantages are pronounced in the case of chain transmissions for driving the camshaft of the engine via its crankshaft. Since both the noise intensity and the wearing of the chain increase with increased chain speed, the disadvantages are even more pronounced in the case of chain transmissions for driving vibration-damping balance shafts arranged on the engine via its crankshaft. A chain in such transmissions is in fact driven at a speed which is considerably higher than the speed at which the chain in camshaft transmissions is driven.

The foregoing disadvantages have been observed by a number of users of tensioning arrangements, but, since no solution to the problems has been forthcoming, certain users have abandoned automatically adjustable tensioning arrangements in favour of manually adjustable tensioning arrangements which must be adjusted "by hand" at regular intervals.

The object of the present invention is to eliminate the abovementioned disadvantages. For this purpose the invention provides a tensioning arrangement for a power-transmitting element incorporated in a transmission and intended to be driven in an endless path. The tensioning arrangement comprises a piston which is displaceable in a cylinder and which, in the cylinder, delimits a space and which directly or indirectly bears against the power-transmitting element; and a spring element which imparts to the piston a first force for conveying to the piston a movement directed towards the power-transmitting element. The invention is characterized in that the space delimited by the piston is connected to a pressure source which only supplies pressure medium to the space when the transmission is in operation, by which means a second force which is directed counter to the first force acts on the piston and conveys to it a limited movement for reduced force effect on the power-transmitting element.

The tensioning arrangement according to the invention provides for an over-stretching of the chain when the engine is not in operation. On the other hand, when the engine is started up, the chain tensioning is reduced to a tensioned but not over-tensioned state. By this means the noise intensity in the chain transmission decreases at the same time as the wearing of the chain is reduced.

In advantageous embodiments the inward movement of the piston is limited by a locking arrangement which cooperates with the piston and which is movable between a first and a second end position in a bore in the tensioning arrangement, which bore connects the oil system of the vehicle engine to the space delimited by the piston. In this way the oil pressure of the engine is used in order, via a locking arrangement with predetermined play, to reduce the chain tensioning to a tensioned but not over-tensioned state.

BRIEF DESCRIPTION OF THE DRAWINGS

Other features characterizing the invention will become apparent from the subsequent patent claims and the following description of an embodiment illustrating the invention. In the description reference is made to the attached figures, of which

DETAILED DESCRIPTION OF THE PREFERRED EMBODIMENTS

Figure 1:
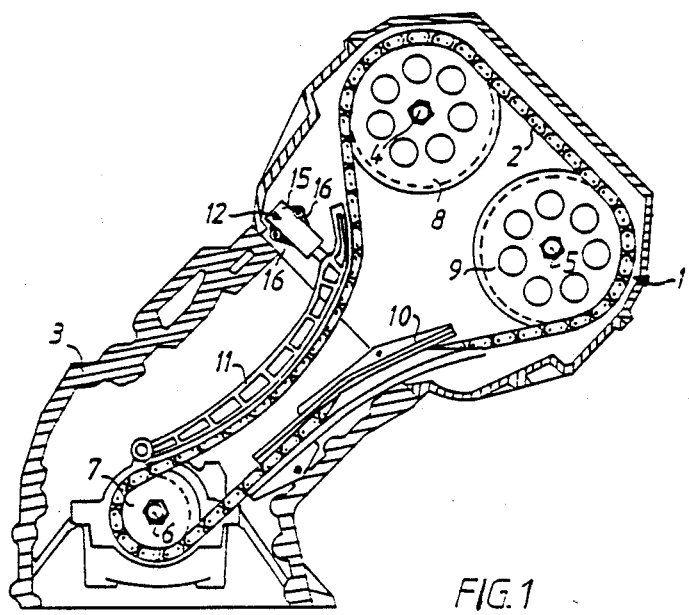
FIG. 1 shows a cross-section of an internal combustion engine with a chain transmission which is acted upon by a tensioning arrangement according to the invention.

FIG. 1 shows a transmission 1 which comprises a power-transmitting element in the form of a chain 2 for transmitting driving power from the crankshaft 6 of an internal combustion engine 3 to its camshafts 4, 5. The one camshaft 4 in this connection controls the inlet valves of the engine 3 and the second camshaft 5 controls its outlet valves. For the foregoing driving power transmission the crankshaft 6 of the engine 3 and each of the camshafts 4, 5 are provided with respective chain wheels 7, 8, 9 in which the chain 2 engages.

Between the crankshaft 6 and the camshaft 5 for the outlet valves the chain 2 is guided by a guide rail 10 arranged in a fixed manner on the engine 3, while it is guided between the camshaft 4 for the inlet valves and the crankshaft 6 by a guide rail 11 which is movable relative to the engine 3. The movable guide rail 11 is at its one end rotatably mounted in the engine 3 in the vicinity of the crankshaft 6 and at its other end is acted upon by a tensioning arrangement 12.

Figure 2:
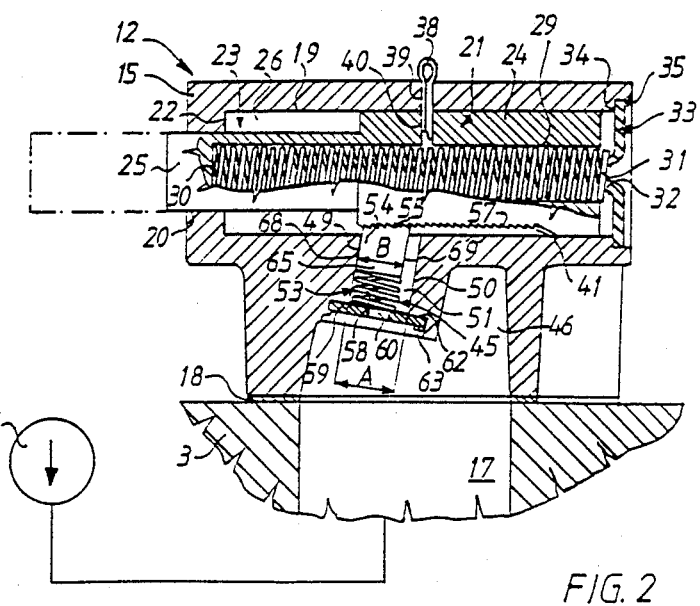
FIG. 2 shows a longitudinal section of the tensioning arrangement according to the invention.

The tensioning arrangement 12 consists of a housing 15 designed with flanges 16 through which screws (not shown) extend for fixing the housing 15 on the engine 3 in position over the mouth, shown in FIG. 2, of a channel 17 through which a pressure-actuating medium in the form of oil is fed to the tensioning arrangement 12. A seal 18 is arranged between the engine 3 and the housing 15 in order to prevent oil leakage.

The housing 15 of the tensioning arrangement 12 is designed with an internal cylinder 19 which, at one end directed towards the guide rail 11, is designed with a gable-end wall with a through-hole 20, which constitutes an abutting surface for a piston 21 which is displaceably arranged in the cylinder 19. The piston 21 is designed with a piston body 24 which is supported against the circumferential surface of the cylinder 19 and with a center rod 25 which projects from the piston body 24 and which is supported against the abutting surface of the hole 20. The piston 21 and the cylinder 19 thus delimit a closed space 26 around the center rod 25.

The piston 21 is designed with an internal bore 29 on whose bottom 30 one end of a spring element in the form of a compression spring 31 lies. The other end of the compression spring 31 is attached to an essentially conical pin 32 which is arranged on a circular washer 33 which covers that end of the cylinder bore which is directed away from the guide rail 11. The washer 33 bears against a circular shoulder surface 34 which is arranged on the housing 15 and is fixed detachably in this position by means of lugs 35 which are arranged on the housing 15 and are bent radially inwards to bear against the washer 33.

In its free state the compression spring 31 has an axial extension which is longer than the piston 21. This means that the compression spring 31, when it is assembled, exerts a force which tends to displace the piston 21 so that its center rod 25 projects out of the housing 15. The projected position is shown with dot-and-dash lines in FIG. 2.

In order to prevent this projection before the tensioning arrangement 12 is assembled on the engine 3, a transport latching device is arranged in the housing 15. The transport latching device comprises a peg 38 which passes through a through-hole 39 in the housing 15 and engages in a likewise through-hole 40 in the piston 21.

The piston body 24 is designed with a recess 41 which delimits a gap between the piston body 24 and the circumferential surface of the cylinder 19. The recess 41, which was produced by means of a circular segment limited in the longitudinal direction being removed from the piston body 24, is connected, on the one hand, with the space 26 around the center rod 25 and, on the other hand, with a oil pump 13 (shown schematically) of the engine 3. The latter connection is effected via a hole 45, a chamber 46 in the housing 15 and the oil channel 17 in the engine 3. The hole 45 which is arranged essentially radially relative to the cylinder 19, has a square cross-section with a front and rear wall 49, 50 in the longitudinal direction of the tensioning arrangement 12 and also two side walls 51. The latter constitute a guide surface for a locking element 54 which is incorporated in a locking arrangement 53 which extends through the hole 45 and locks the piston 21 against introduction into the cylinder 19. In FIG. 2 only the one side wall 51 is shown.

The locking element 54 is designed with saw-tooth-like shoulder surfaces 55 which engage in corresponding shoulder surfaces 57 formed in the bottom of the recess 41. The locking element 54 bears against one end of a spring element which is made up of a compression spring 58. The other end of the compression spring 58 bears against a circular washer 59 which is designed with a through-hole 60. The washer 59 bears against a shoulder surface 62 which is arranged in the housing 15, and is detachably fixed in this position by means of lugs 63 which are designed in the housing 15 and are bent radially inwards and surround the edge of the washer 59. The locking arrangement 53 is dimensioned such that the compression spring 58 continuously presses the saw-tooth-like shoulder surfaces 55 of the locking element 54 into engagement with shoulder surfaces 57 of the piston 21. By this means a relative movement is permitted between the piston 21 and the locking element 54 when the compression spring 31 imparts to the piston 21 a movement projecting it out of the housing 15, while relative movement in the opposite direction is prevented.

The locking element 54 is designed with two side walls 65 which bear against the side walls 51 of the hole 45, and with a front and rear wall 68, 69 in the longitudinal direction of the housing 15. The distance A between the front and rear walls 49, 50 of the hole 45 is 1–5 mm greater than the distance B between the front and rear walls 68, 69 of the locking element 54. In an advantageous embodiment the distance is 2–3 mm greater than the distance between the walls 68, 69 of the locking element 54.

The above means that the locking element 54 cannot move in the latitudinal direction of the housing 15, but that it has limited mobility, i.e. play, in the longitudinal direction of the housing 15.

Figure 3:
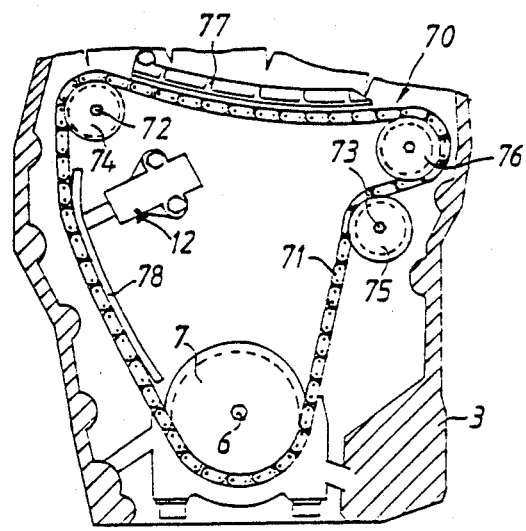
FIG. 3 shows a cross-section of an internal combustion engine with a tensioning arrangement according to the invention arranged in a balance shaft transmission.

Since the noise intensity and wearing of the chain in a chain transmission increase with increased chain speed, it is advantageously possible to arrange the tensioning arrangement according to the invention in chain transmissions where the chain is driven at a speed which is considerably greater than the speed at which the chain is driven in the camshaft transmission described. As an example of this, reference is made to FIG. 3 which shows a balance shaft transmission 70 which comprises a chain 71 for transmitting driving force from the crankshaft 6 to two balance shafts 72, 73 which are designed to dampen engine vibrations. For the said driving force transmission the crankshaft 6 and each of the balance shafts 72, 73 are provided with respective chain wheels 7, 74, 75 in which the chain 71 engages. The chain 71 moreover engages in a chain wheel 76 which is arranged in the engine 3 for guiding the chain 71 so that the one balance shaft 73 is driven by the outside of the chain 71 while the other balance shaft 72 is driven by the inside of the chain 71.

Between the balance shafts 72, 73 the chain 71 is guided by a guide rail 77 arranged in a fixed manner in the engine 3, while it is guided between the one balance shaft 72 and the crankshaft 6 by a movable guide rail 78. The movable guide rail 78 is at its one end rotatably mounted in the engine 3 in the vicinity of the crankshaft 6 and at its other end is acted upon by the tensioning arrangement 12 according to the invention.

The tensioning arrangement described functions in the following way.

Before assembly in the engine 3, the tensioning arrangement 12 is in the pre-assembled state shown in FIG. 2. The assembly procedure is initiated by the tensioning arrangement 12 being screwed firmly in the engine 3. The peg 38 is thereafter withdrawn. As the latter is withdrawn, the compression spring 31 overcomes the wedging effect between the shoulder surfaces 55 of the locking element 54 and the shoulder surfaces 57 of the piston 21. The compression spring 31 thus presses the piston 21 out to bear against the guide rail 11, which in turn is pressed against the chain 2 and imparts to this a certain over-stretching. Since the shoulder surfaces 57 in the piston 21 cooperate with the shoulder surfaces 55 in the locking element 54, the locking element 54 is displaced so that its front wall 68 comes to bear against the front hole wall 49 during the projecting movement of the piston 21.

When the engine 3 is started up, the oil pump 13 begins to feed a flow of oil, which is supplied to the space 26 via the channel 17, the chamber 46, the hole 60, the hole 45 and the recess 41. When the oil pressure increases in the space 26, the compression spring 31 is unable to maintain the piston 21 in its projected position, but rather the piston 21 is forced into the cylinder 19.

However, as a result of the locking effect of the shoulder surfaces 55, 57, the piston 21 can only be pushed back until the rear wall 69 of the locking element 54 comes to bear against the rear hole wall 50. As the piston 21 is pushed back, the pressure of the guide rail 11 against the chain 2 decreases, and the latter is thus slackened. The hole 45 and the play existing therein relative to the locking element 54 are, however, dimensioned such that the chain 2 is only slackened to the extent that it is sufficiently tensioned but not over-tensioned.

When the engine 3 is stopped, the oil pressure from the oil pump ceases, with the result that the compression spring 31 again forces the piston 21 out of the housing 15 and imparts to the chain 2 a certain over-stretching.

As the chain 2 becomes worn, it is necessary for the piston 21 to be able to project further out of the cylinder 23 in order to impart over-stretching to the chain 2. This is achieved in the case of a stopped engine 3 by the compression spring 21 continuously forcing the piston 21 outwards so that the wedge effect between the shoulder surfaces 55 of the locking element 54 and the shoulder surfaces 57 of the piston 21 is overcome when it is necessary to carry out adjustments, in which connection the piston 21 assumes a new position pressing against the guide rail 11.

It becomes apparent from the above description that the invention automatically produces a stretching of the chain when the engine is shut down, but uses the oil pressure of the engine during operation in order, via a locking arrangement with given play, to reduce the chain stretching to the desired level and in this way to lower the noise level and to reduce wearing of the chain.

The invention should not be regarded as limited to the described embodiment, but can be modified within the scope of the subsequent patent claims in a number of alternative embodiments.

In the tensioning arrangement now described the locking arrangement is arranged in the wall through which oil is fed to the space around the center axle. In an alternative embodiment it is possible to arrange the lock so that it is separate from the hole. In such an embodiment it is also possible to design the shoulder surfaces cooperating with the locking element on the circumferential surface of the piston instead of at the bottom of a recess formed in the piston. Other modifications are also possible without departing from the inventive concept.

Even though the invention is primarily intended for chain transmissions in vehicles, it is advantageously possible to use it also in other transmissions which, instead of using a chain, use V-belts, tooth belts or bands as power-transmitting elements.

What is claimed:

1. A tensioning arrangement for an endless-path flexible, power transmitting element, comprising:
   a cylinder;
   a piston displaceable in the cylinder and means between the piston and the power-transmitting element bearing against the power-transmitting element for increasing the tension of the element; the piston being shaped with respect to the shape of the cylinder for delimiting a space in the cylinder and the space is placed such that pressurizing the space urges the piston away from tensioning the element;
   a spring for imparting to the piston a first force for urging the piston to move toward tensioning the power-transmitting element; and
   a pressure source connected to the space for feeding a pressure medium to the space only when the power transmitting element is in operation, for pressurizing the space for applying a second force on the piston directed counter to the first force on the piston for imparting to the piston a limited movement for reduced force effect on the power-transmitting element.

2. A tensioning arrangement according to claim 1, further comprising locking means for engaging the piston for reducing the force effect of the piston upon the power-transmitting element.

3. A tensioning arrangement according to claim 2, wherein the locking means comprises
   first and second stops defined in the arrangement and spaced apart along the path of movement of the piston; and
   moveable means in engagement with the piston to be moved by the piston to bear against the first stop upon movement of the piston toward tensioning the power-transmitting element and to bear against the second stop upon movement of the piston toward reduced force effect on the power-transmitting element.

4. A tensioning arrangement according to claim 3, wherein the moveable means is shorter in its length between the stops than the distance between the stops, whereby the moveable means move through the space between the stops permitting corresponding movement of the piston.

5. A tensioning arrangement according to claim 4, wherein the moveable means is sized to be moveable over a distance between the first and second stops in the range of 1-5 mm.

6. A tensioning arrangement according to claim 1, further comprising the power-transmitting element and the element comprising an endless chain.

7. In combination, an internal combustion engine of the type including an oil pump and an oil channel connected to the oil pump combined with the tensioning arrangement according to claim 2, and further comprising a hole in the tensioning arrangement and connecting the oil channel to the space delimited by the piston and the locking means extends through the hole.

8. A combination according to claim 7, further comprising the power-transmitting element and the element comprising an endless chain; and
   a balance shaft transmission in which the chain is incorporated.

9. A tensioning arrangement according to claim 3, wherein the locking means comprises a locking element having first saw-tooth like shoulder surfaces and the piston having a side thereof having corresponding saw-tooth like shoulder surfaces thereon for engaging the first shoulder surfaces.

10. A tensioning arrangement according to claim 9, further comprising a second spring bearing against the locking element for urging the shoulder surfaces of the locking element to engage the shoulder surfaces of the piston.

11. A tensioning arrangement according to claim 8, wherein the corresponding shoulder surfaces are shaped for permitting relative movement between the locking element and the piston when the first spring acts on the piston to move it out of the cylinder toward tensioning the element but prevents relative movement of the piston in the opposite direction.

12. A tensioning arrangement according to claim 10, wherein the shoulder surfaces of the piston are located at the bottom of a recess in the piston that communicates to the space delimited by the piston.

13. A tensioning arrangement according to claim 10, further comprising a washer having a screwhole therethrough against which the second spring element bears.

14. A tensioning arrangement according to claim 6, comprising a hole in the arrangement for receiving the locking means and the locking means and the hole cooperating therewith having square cross-sections.

15. A combination according to claim 3, comprising a hole in the arrangement for receiving the locking means and the locking means and the hole cooperating therewith having square cross-sections.

16. A tensioning arrangement according to claim 3, wherein the locking means has a first surface for engaging the piston and the piston having a side thereof for being engaged by the first surface.

17. A tensioning arrangement according to claim 16, further comprising a second spring bearing against the locking element for urging the first surface against the side of the piston.

* * * * *